United States Patent
Park

(10) Patent No.: US 8,253,282 B2
(45) Date of Patent: Aug. 28, 2012

(54) LINEAR VIBRATOR

(75) Inventor: Youngil Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 141 days.

(21) Appl. No.: 12/953,861

(22) Filed: Nov. 24, 2010

(65) Prior Publication Data

US 2011/0127858 A1 Jun. 2, 2011

(30) Foreign Application Priority Data

Nov. 26, 2009 (KR) .................. 10-2009-0114938

(51) Int. Cl.
*H02K 33/00* (2006.01)
(52) U.S. Cl. .......................................... 310/25; 310/81
(58) Field of Classification Search .................. 310/21, 310/25, 29, 36–37, 12.27, 12.33, 81
See application file for complete search history.

(56) References Cited

U.S. PATENT DOCUMENTS

| | | | |
|---|---|---|---|
| 7,911,098 B2 * | 3/2011 | Lee et al. | 310/81 |
| 7,999,421 B2 * | 8/2011 | Kim et al. | 310/15 |
| 2010/0052578 A1 * | 3/2010 | Kim | 318/114 |
| 2010/0277009 A1 * | 11/2010 | Jeon | 310/25 |
| 2010/0277010 A1 * | 11/2010 | Jeon | 310/25 |
| 2010/0327673 A1 * | 12/2010 | Jun et al. | 310/25 |
| 2011/0006618 A1 * | 1/2011 | Lee et al. | 310/25 |
| 2011/0012441 A1 * | 1/2011 | Oh et al. | 310/25 |
| 2011/0018364 A1 * | 1/2011 | Kim et al. | 310/17 |
| 2011/0018365 A1 * | 1/2011 | Kim et al. | 310/17 |
| 2011/0018367 A1 * | 1/2011 | Kim et al. | 310/25 |

* cited by examiner

*Primary Examiner* — Thanh Lam
(74) *Attorney, Agent, or Firm* — Saliwanchik, Lloyd & Eisenschenk

(57) ABSTRACT

Disclosed is a linear vibrator, the linear vibrator including a substrate supplying electric power, a case including a base supporting the substrate and a cover wrapping the base, a stator fixed to either the base or the cover, a vibrator including magnets each arranged to face both sides of the stator and a weight to which the magnets are fixed, an inner spring coupled to both sides of the weight to wrap the weight, and an external spring, both end portions of which are coupled to an inner lateral surface of the case to wrap the inner spring, and a part of which is coupled to the inner spring.

20 Claims, 3 Drawing Sheets

LINEAR VIBRATOR

CROSS-REFERENCE TO RELATED APPLICATION

This application claims the benefit under 35 U.S.C. §119 of Korean Patent Application No. 10-2009-0114938, filed Nov. 26, 2009 which are hereby incorporated by reference in their entirety.

BACKGROUND OF THE DISCLOSURE

1. Field of the Invention

The present disclosure relates to a linear vibrator that vibrates horizontally.

2. Discussion of the Related Art

A conventional vibration motor includes a substrate soldered with a cylindrical coil, a housing that fixes the substrate, a spring mounted inside the housing, and yoke, one side of which is fixed at the spring while the other side of which is mounted with a magnet and a vibrator is mounted at a lateral surface thereof.

This type of vibration motor is configured in such a manner that a vibrator is vertically vibrated by attractive force and repulsive force generated by magnetic fields of the coil and the magnet. That is, the conventional vibration motor is such that a spring (20) is vertically and elastically deformed, where a vibrator elastically supported by the spring is vertically vibrated.

The conventional vibration motor is such that a natural frequency of a vibration motor is determined by mass of a magnet and a vibrator and modulus of elasticity of a spring, and the conventional vibration motor has a constant within a specific frequency band. A small-sized vibration motor generally generates vibration according to resonance due to smaller input power level.

BRIEF SUMMARY

The present disclosure is to provide a linear vibrator that is suitable for vibration in mutually different frequency bands.

Technical subjects to be solved by the present disclosure are not restricted to the above-mentioned description, and any other technical problems not mentioned so far will be clearly appreciated from the following description by the skilled in the art.

In one general aspect of the present disclosure, there is provided a linear vibrator, the linear vibrator comprising: a substrate supplying electric power, a case including a base supporting the substrate and a cover wrapping the base, a stator fixed to either the base or the cover, a vibrator including magnets each arranged to face both sides of the stator and a weight to which the magnets are fixed, an inner spring coupled to both sides of the weight to wrap the weight, and an external spring, both end portions of which are coupled to an inner lateral surface of the case to wrap the inner spring, and a part of which is coupled to the inner spring.

In another general aspect of the present disclosure, there is provided a linear vibrator, the linear vibrator comprising: a substrate supplying electric power; a case including a base supporting the substrate and a cover wrapping the base; a coil fixed at the case and applied with a first power for generating a first frequency corresponding to a first natural frequency, and with a second power for generating a second frequency corresponding to a second natural frequency; a vibrator including a magnet facing the coil and a weight fixed by the magnet; and an elastic member including an external spring elastically supporting the vibrator and having mutually different modulus of elasticity and an inner spring coupled to the external spring and the vibrator, wherein the vibrator is resonated at the first natural frequency if the coil is applied with a power of the first frequency, and the vibrator is resonated at the second natural frequency if the coil is applied with a power of the second frequency.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION

Figure 1:
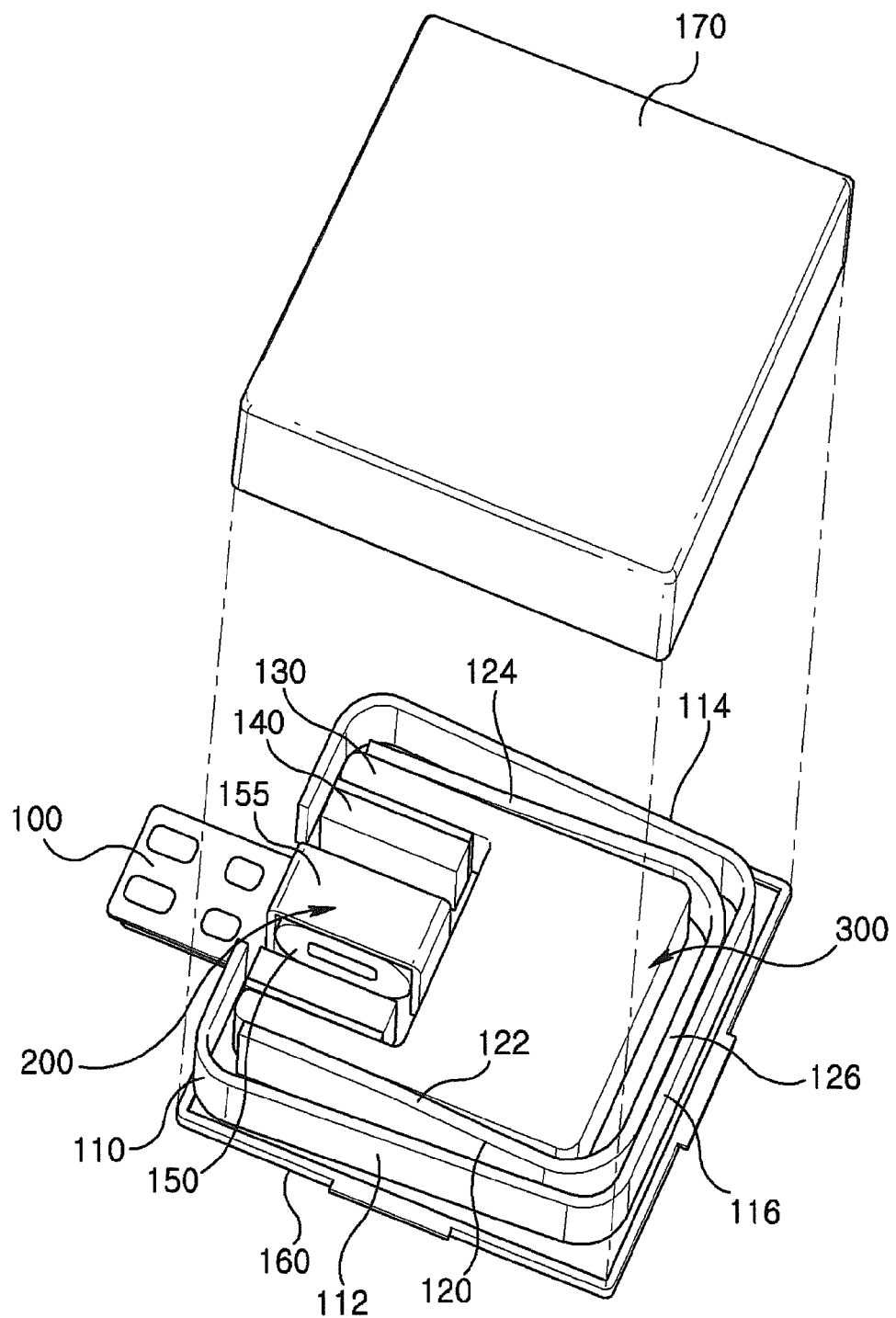
FIG. 1 is an exploded perspective view of a linear vibrator according to an exemplary embodiment of the present disclosure.

Hereinafter, exemplary embodiments of the present disclosure are described in detail with reference to the accompanying drawings. In the drawings, sizes or shapes of constituent elements may be exaggerated for clarity and convenience.

Particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification. Acronyms are used extensively throughout the description to avoid excessively long descriptive phrases. The meaning will be clear from the context of the description.

Figure 2:
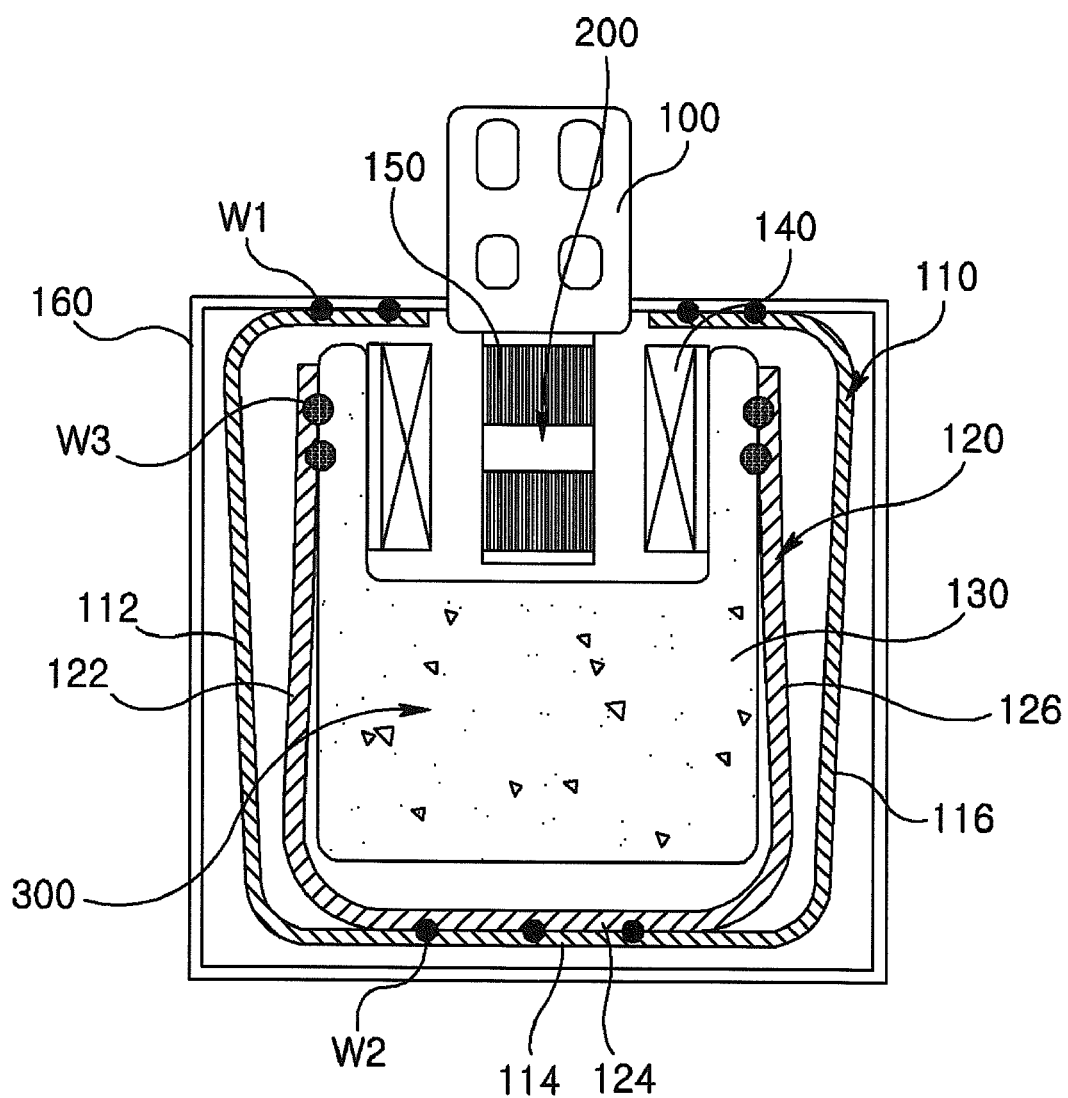
FIG. 2 is a plan view illustrating an inner structure of a linear vibrator according to an exemplary embodiment of the present invention.
Figure 3:
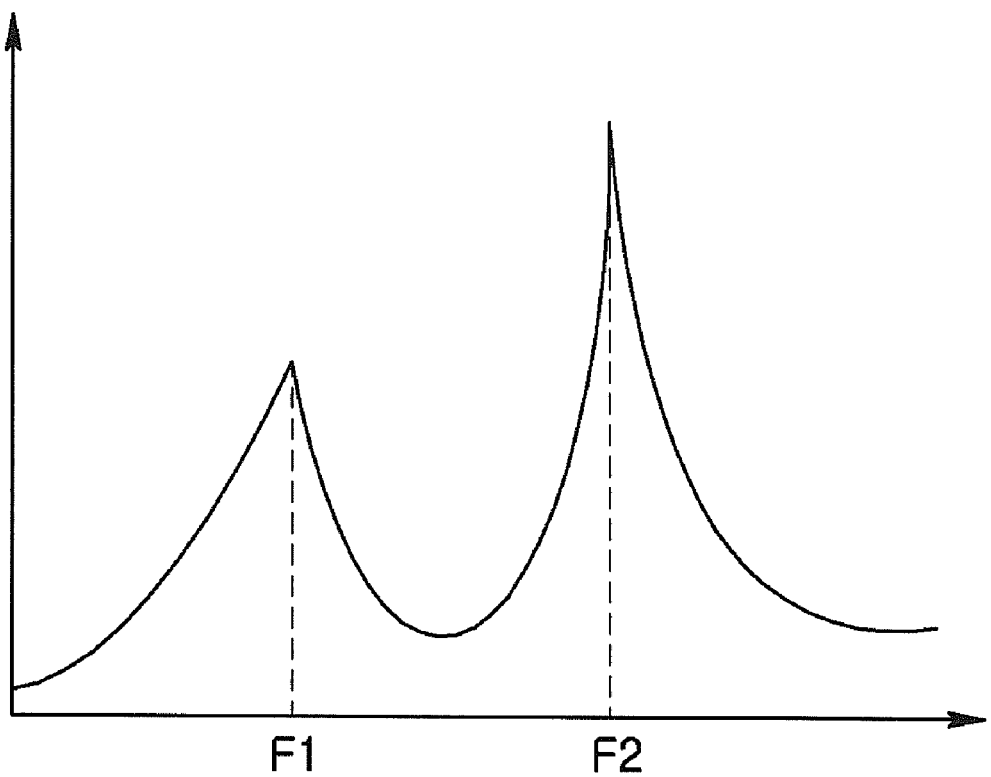
FIG. 3 is a graph illustrating a frequency response characteristic of a linear vibrator according to an exemplary embodiment of the present invention.

FIG. 1 is an exploded perspective view of a linear vibrator according to an exemplary embodiment of the present disclosure, FIG. 2 is a plan view illustrating an inner structure of a linear vibrator according to an exemplary embodiment of the present invention, and FIG. 3 is a graph illustrating a frequency response characteristic of a linear vibrator according to an exemplary embodiment of the present invention.

Now, construction and operation of the linear vibrator according to the present disclosure will be described in detail.

Referring to FIGS. 1, 2 and 3, a linear vibrator according to an exemplary embodiment of the present disclosure may include a stator (200) and vibrators (300). The stator (200) and the vibrators (300) may be accommodated into an accommodation space of a case including a base (160) and a cover (170).

In the exemplary embodiment of the present disclosure, the cover (170) may take the shape of a bottom-opened cylinder, and a lower end of a lateral surface of the cover (170) is welded to the plate-shaped base (160), and the cover (170) and the base (160) function as a body of the linear vibrator.

A substrate (100) is fixed on the base (160), and the substrate (100) is arranged with a coil (150). The coil (150) is applied with electric power that is supplied through the substrate (100). The coil (150) is wound with a predetermined thickness of conductor, both distal ends of which are electrically connected to the substrate (100) by way of soldering, whereby the coil (150) is supplied with the electric power.

In the present exemplary embodiment of the present disclosure, the coil (150) may be wound in parallel with the vertical direction of the substrate (100), where the vibrators (300) are resonated to the natural frequency corresponding to a switching frequency in response to the switching frequency of the electric power applied to the coil (150). In order to inhibit the coil (150) from being damaged from leaking electromagnetic power lines, the coil (150) may be arranged thereabout with a bobbin (or a yoke 155).

According to the present disclosure, an elastic member including inner and external springs (110, 120) is coupled to the vibrators (300), whereby the vibrators (300) are resonated at a plurality of natural frequencies. The inner and external springs (110, 120) vibrate the vibrators in a parallel direction with the base (160).

Furthermore, the stator (200) may be arranged opposite to the vibrator (300). Therefore, the vibrator (300) characteristically vibrates crosswise or lengthwise of the linear vibrator.

In a case the stator (200) includes the coil (150), and the vibrator (300) includes a magnet (140), the magnet (140) may vibrate to one side or the other side of the coil (150) about the coil (150). As a result, the linear vibrator according to the present disclosure is advantageous over a linear vibrator vibrating to a vertical direction relative to the base (160) in that a sufficient vibration may be obtained even with a smaller electric power application, and vibration strength may be increased.

The substrate (100) may include a printed circuit board (PCB. 100) made of rigid material such as Bakelite, or a flexible printed circuit (FPC), or a flexible flat cable (FFC) made of soft material such as polyimide.

The stator (200) may be fixed at the base (160) or at the cover (170). In the present exemplary embodiment, the stator (200) is fixed on the substrate (100) formed on the base (160). The vibrator (300) facing the stator (200) is resonated at a plurality of natural frequencies, such that it is possible to obtain a sufficient amount of vibration even if power supply is insufficiently provided to small-sized electronic devices.

The vibrator (300) opposite to the stator (200) that is resonated by the electromagnetic force may include magnets (140), a weight (130), an elastic member having an external spring (110) and an inner spring (120). Each of the magnets (140) opposite to the coil (150) is mounted on each side of the coil (150).

The weight (130) shaped of square plate is formed at one side thereof with a groove for accommodating the coil (150). Each of the magnets (140) is arrange on an inner surface facing the weight (130) formed by the groove, whereby the coil (150) is arranged between the magnets. The weight (130) may further increase the amount of vibration of the linear vibrator and may have a mass corresponding to the natural frequency of the linear vibrator.

The vibrator (300) may generate a plurality of natural frequencies corresponding to each function of electronic devices mounted on the linear vibrator. Generally, in the mass-elasticity-damping system, a natural frequency of the system is determined by the mass and the elasticity. Methods of allowing the vibrator (300) to have a plurality of natural frequencies may vary. In the present exemplary embodiment, a method of installing a plurality of inner and external springs (110, 120) that elastically support the mass is utilized, instead of using a method of installing a plurality of masses having an independent vibration displacement, such that a plurality of natural frequencies may be obtained that are clearly distinguished in a thin miniaturized structure.

For example, in a case the linear vibrator according to the present disclosure needs vibration components of a first frequency and a second frequency for each function of electronic devices that is to be mounted, the linear vibrator according to the present disclosure may include the inner and external springs (120, 110) having a first natural frequency (F1) in which a natural frequency of the vibrator (300) corresponds to a first frequency, and a second natural frequency (F2) in which the natural frequency corresponds to a second frequency.

To this end, each of the external and inner springs (110, 120) has a different modulus of elasticity. The vibrator (300) may be resonated at the plurality of natural frequencies by the external and inner springs (110, 120) each having a different modulus of elasticity.

Furthermore, a boundary condition affecting the natural frequencies of the system is changed to design support structures of the external and inner springs (110, 120) in mutually different styles, whereby the first natural frequency (F1) and the second natural frequency (F2) may be clearly differentiated.

The mutually different first natural frequency (F1) and the second natural frequency (F2) are illustrated in detail in FIG. 3. Although FIG. 3 illustrates the first natural frequency (F1) that is smaller than the second natural frequency (F2), an opposite case may occur where the first natural frequency (F1) is larger than the second natural frequency (F2), by differently designing the support conditions corresponding to boundary conditions in the vibration equation or shapes of the external and inner springs (110, 120).

In the present exemplary embodiment, the stator (200) may include the coil (150) receiving the electric power by being connected to the substrate (100), where the vibrator (300) may include the magnet (140), the weight (130) and the external/inner springs (110, 120).

Apart from the illustrated exemplary embodiment, other exemplary embodiments may be also implemented by providing the stator (200) including the magnet (140), the weight (130) and a plurality of external/inner springs (110, 120), and by providing the vibrator (300) including the coil (150).

Although the present exemplary embodiment includes the external/inner springs (110, 120), the embodiment is not limited thereto. For example, an additional spring may be included.

The external spring (110) may include a first external spring unit (112), a second external spring unit (114) and a third external spring unit (116). The first and second external spring units (112, 114) are fixed at an inner lateral surface of the cover (170), and the third external spring unit (116) connect the first external spring unit (112) to the second external spring unit (114). The third external spring unit (116) may be arranged opposite to the stator (200).

A gap formed between the first external spring unit and a lateral surface of the weight (130) facing the first external spring unit (112), and a gap formed between the second external spring unit (114) and a lateral surface of the weight (130) facing the second external spring unit (114) decrease while facing from the third external spring unit (116) to the cover (170).

The inner spring (120) may include a first inner spring unit (122), a second inner spring unit (124) and a third inner spring unit (126). The first and second inner spring units (122, 124) are fixed at both lateral surfaces each facing the weight (130), and the third inner spring unit (126) is connected to the first inner spring unit (122) and the second inner spring unit (124). The third inner spring unit (126) may be arranged opposite to the lateral surface of the weight (130) facing the stator (200).

A gap formed between the first inner spring unit and a lateral surface of the weight (130) facing the first inner spring unit (122), and a gap formed between the second inner spring unit (124) and a lateral surface of the weight (130) facing the second inner spring unit (124) increase while facing from the distal ends of the first and second inner spring units (122, 124) to the lateral surface of the weight (130) facing the third inner spring unit (126).

The third inner spring unit (126) of the inner spring unit (120) is fixed by the third external spring unit (116) of the external spring unit (110), and has different modulus of elasticity relative to the external spring (110) and the inner spring unit (120) and has different boundary conditions, whereby the vibrator (300) may generate a plurality of natural frequencies.

In the present exemplary embodiment, the first external spring unit (112) of the external spring (110) and the second external spring unit (114) is welded to the cover (170) at a first welding unit (W1) of the cover (170).

The third inner spring unit (126) of the inner spring (120) is welded to the third external spring unit (116) at a second welding unit (W2). The first and second inner spring units (122, 124) of the inner spring (120) are welded to a third welding unit (W3) formed at both lateral surfaces of the weight (130). The magnet (140) opposite to the stator (200) is located near to the third welding unit (W3) to be coupled to the weight (130).

The structure thus configured according to the present disclosure may obtain a plurality of natural frequencies that are clearly separated, despite its simple configuration. The effect may be further reinforced by the structure in which boundary conditions of each of the external and inner springs (110, 120) are clearly discerned by the plurality of welding units (W1, W2, W3).

Furthermore, reinforcement of coupling strength between the external and inner springs (110, 120) may improve reliability problems in which vibrator (300) is detached, or fixed state of the vibrator (300) is damaged, despite long time of use. Working of vibration direction to a crosswise direction of the linear vibrator may overcome the limitation in which the conventional linear vibrator vibrates to a vertical direction.

In the present exemplary embodiment, each of the external and inner springs (110, 120) takes the shape of a band type elastic member that is bent. Each of the external and inner springs (110, 120) takes the shape and the support structure of a cantilever, if viewed from the lateral surface, to sufficiently reduce the modulus of elasticity even with a thin thickness of material, which is very effective in obtaining a low natural frequency. In addition, the adjustment of the natural frequency may be accomplished by mass of the weight (130). That is, increase of modulus of elasticity of the external and inner springs (110, 120) or decrease of mass in the weight (130) may increase the value of the natural frequency.

The external spring takes the shape of an opened capital 'U' at a portion fixed to the cover (170), and each of the inner and external springs is coupled by welding. The inner spring (120) is fixed to the external spring (110) and an opposite side of a portion fixed to the external spring (110) takes the opened capital 'U'. The opened portions of the external and inner springs (110, 120) are formed with the stator (200).

The coil (150) may be applied with a first power for generating a first frequency corresponding to a first natural frequency, and with a second power for generating a second frequency corresponding to a second natural frequency. The vibrator (300) may include the magnet (140) opposite to the coil (150), the weight (130) that adds mass to the magnet (140), and external and inner springs (110, 120) elastically supporting the weight (130) and having mutually different modulus of elasticity.

In a case the coil (150) is applied with an electric power of the first frequency, the vibrator (300) is resonated at the first natural frequency (F1), and in a case the coil (150) is applied with an electric power of the second frequency, the vibrator (300) is resonated at the second natural frequency (F2).

At this time, the external spring (110) is fixed to the cover (170), the inner spring (120) is fixed to the external spring (110), and the magnet (140) and the weight (130) are fixed to the inner spring (120).

The above-mentioned linear vibrator according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. A linear vibrator comprising:
a substrate supplying electric power;
a case including a base supporting the substrate and a cover wrapping the base;
a stator fixed to either the base or the cover;
a vibrator including magnets each arranged to face both sides of the stator and a weight to which the magnets are fixed;
an inner spring coupled to both sides of the weight to wrap the weight; and
an external spring, both end portions of which are coupled to an inner lateral surface of the case to wrap the inner spring, and a part of which is coupled to the inner spring.

2. The linear vibrator of claim 1, wherein the stator is arranged at the substrate and include a coil so wound as to generate a magnetic field in response to electric power.

3. The linear vibrator of claim 2, wherein the weight includes a groove formed by a lateral surface not wrapped by the inner spring for accommodating the stator, where inner lateral surfaces facing the weight formed by the groove is formed with the magnets facing the stator.

4. The linear vibrator of claim 1, wherein both end portions of the inner lateral surface are fixed at first and second lateral surfaces of the weight facing the magnets, and the inner spring wraps the first and second lateral surfaces and a third lateral surface connected to the first and second lateral surfaces.

5. The linear vibrator of claim 4, wherein the inner surface includes a first inner spring unit fixed at the first lateral surface, a second inner spring unit fixed at the second lateral surface and a third inner spring unit connected to the first and second inner spring units.

6. The linear vibrator of claim 5, wherein a gap formed by the first inner spring unit and the first lateral surface, and the second inner spring unit and the second lateral surface increase while turning from the distal ends of the first and second inner spring units to the third lateral surface.

7. The linear vibrator of claim 1, wherein both end portions of the external spring are respectively coupled to the inner lateral surface of the cover facing the stator.

8. The linear vibrator of claim 7, wherein the external spring includes first and second external spring units opposite to the lateral surfaces facing the weights, and a third external spring units connecting the first and second external spring units and coupled to a part of the inner spring unit.

9. The linear vibrator of claim 8, wherein a gap formed between the third external spring units and the lateral surfaces narrows down while turning from the third external spring units to end portions of the first and second external spring units.

10. The linear vibrator of claim 1, wherein the inner spring and the external spring have respectively different modulus of elasticity.

11. The linear vibrator of claim 1, wherein each lateral surface of the inner lateral spring and the weight is coupled by welding.

12. The linear vibrator of claim 1, wherein each of the inner and external springs takes the shape of a 'U', and each of the inner and external springs is coupled by welding.

13. A linear vibrator comprising:
a substrate supplying electric power;
a case including a base supporting the substrate and a cover wrapping the base;
a coil fixed at the case and applied with a first power for generating a first frequency corresponding to a first natural frequency, and with a second power for generating a second frequency corresponding to a second natural frequency;
a vibrator including a magnet facing the coil and a weight fixed by the magnet; and
an elastic member including an external spring elastically supporting the vibrator and having mutually different modulus of elasticity and an inner spring coupled to the external spring and the vibrator,
wherein the vibrator is resonated at the first natural frequency if the coil is applied with a power of the first frequency, and the vibrator is resonated at the second natural frequency if the coil is applied with a power of the second frequency.

14. The linear vibrator of claim 13, wherein the external spring is fixed at the case, a part of the inner spring is fixed at the external spring and the magnet and the weight is fixed at the inner spring.

15. The linear vibrator of claim 13, wherein both end portions of the inner lateral surface are fixed at first and second lateral surfaces of the weight facing the magnets, and the inner spring wraps the first and second lateral surfaces and a third lateral surface connected to the first and second lateral surfaces.

16. The linear vibrator of claim 15, wherein the inner surface includes a first inner spring unit fixed at the first lateral surface, a second inner spring unit fixed at the second lateral surface and a third inner spring unit connected to the first and second inner spring units.

17. The linear vibrator of claim 15, wherein a gap formed by the first inner spring unit and the first lateral surface, and the second inner spring unit and the second lateral surface increase while turning from the end portions of the first and second inner spring units to the third lateral surface.

18. The linear vibrator of claim 13, wherein both end portions of the external spring may be respectively coupled to the inner lateral surface of the cover facing the stator.

19. The linear vibrator of claim 18, wherein the external spring includes first and second external spring units opposite to the lateral surfaces facing the weights, and a third external spring units connecting the first and second external spring units and coupled to a part of the inner spring unit.

20. The linear vibrator of claim 18, wherein a gap formed between the third external spring units and the lateral surfaces narrows down while turning from the third external spring units to distal ends of the first and second external spring units.

* * * * *